Jan. 2, 1945. W. W. DODGE, JR 2,366,391
CONTROL MECHANISM FOR VEHICLES
Filed March 24, 1941 7 Sheets-Sheet 1

Inventor
William W. Dodge Jr.
By
Attorney

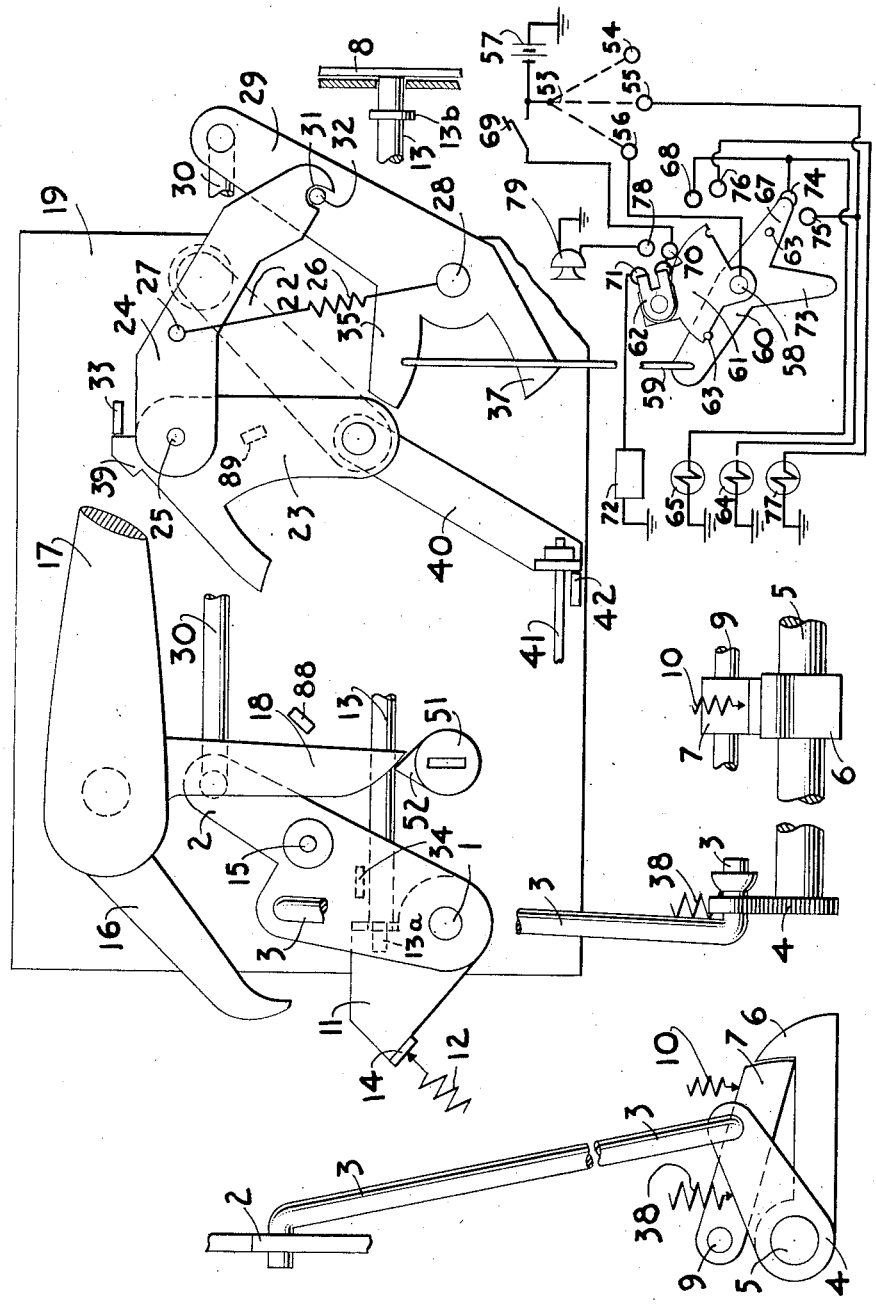

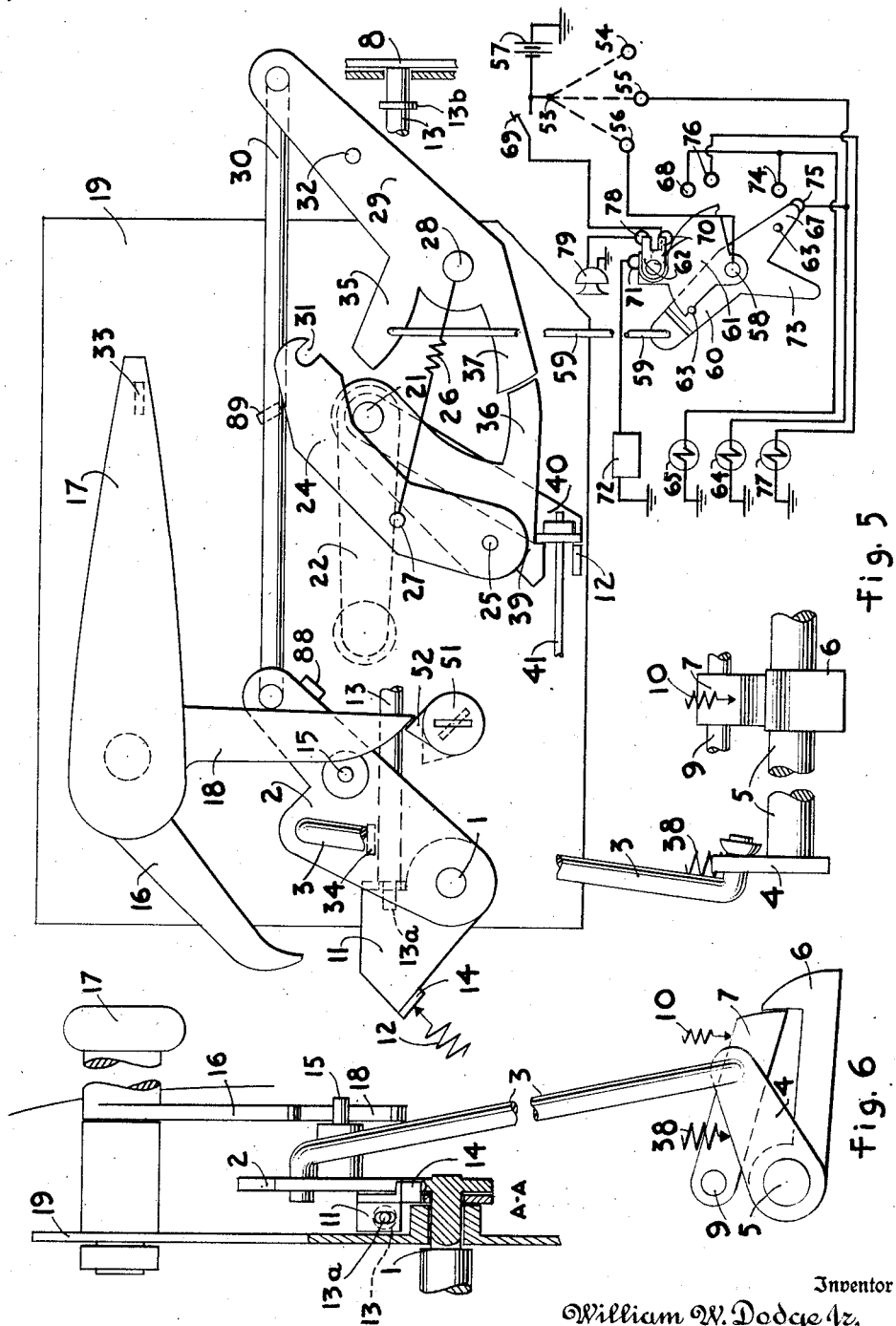

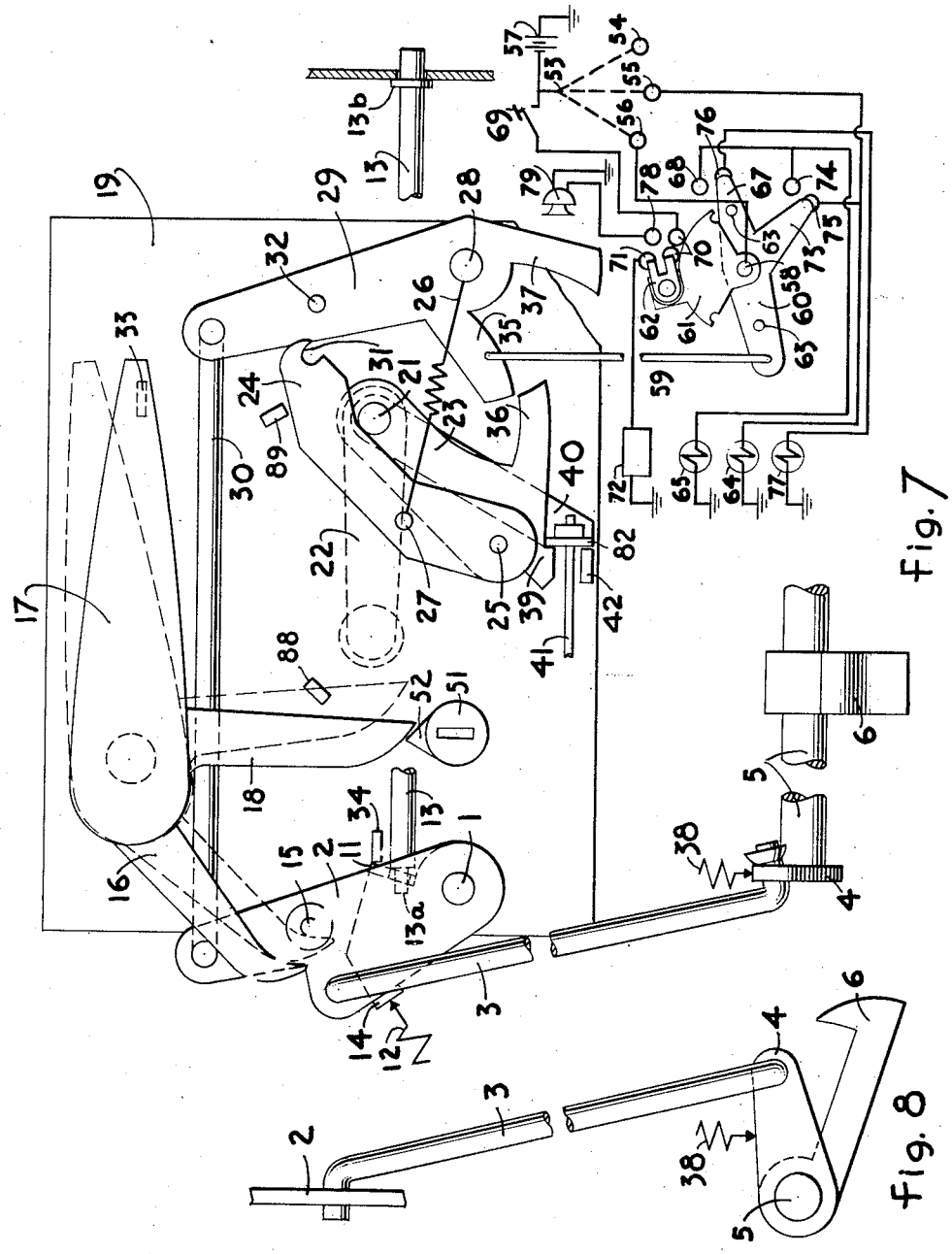

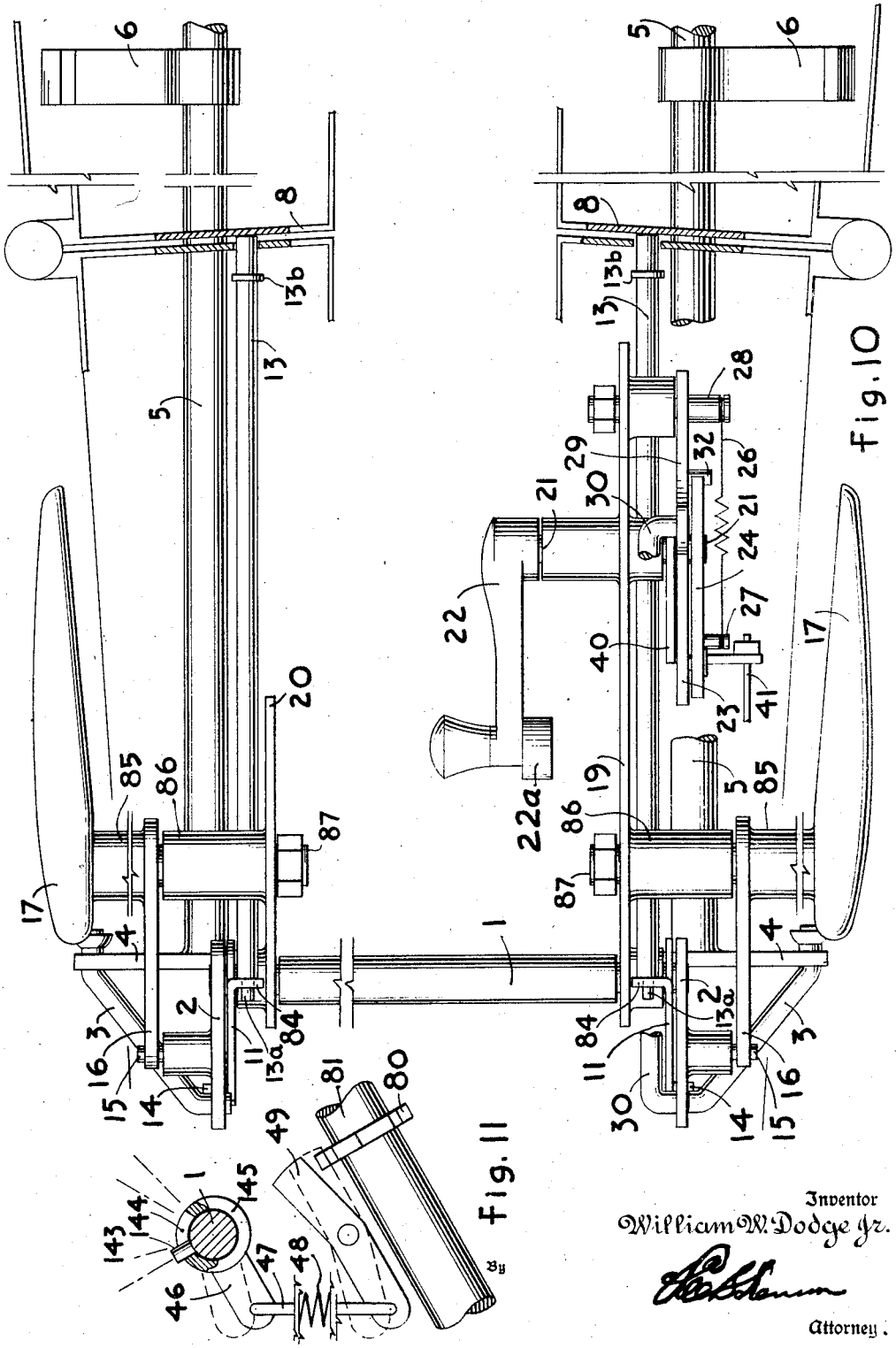

Jan. 2, 1945.  W. W. DODGE, JR  2,366,391
CONTROL MECHANISM FOR VEHICLES
Filed March 24, 1941  7 Sheets-Sheet 7

Inventor
William W. Dodge Jr.
By
Attorney.

Patented Jan. 2, 1945

2,366,391

UNITED STATES PATENT OFFICE 2,366,391

CONTROL MECHANISM FOR VEHICLES

William W. Dodge, Jr., Asheville, N. C.

Application March 24, 1941, Serial No. 384,995

25 Claims. (Cl. 70—264)

This invention relates to improvements in control mechanism for pleasure cars and other vehicles.

In my copending application Serial No. 294,184, filed September 9, 1939 (now Patent No. 2,235,830 dated March 25, 1941), I have disclosed a control mechanism for vehicles, whereby the vehicle doors or closures may be latched or unlatched by an actuator inside the vehicle and also by an actuator accessible outside the vehicle. The present invention also provides a control mechanism which is adapted to latch or unlatch the car doors either inside or outside the vehicle and which is further adapted to perform additional controlling functions.

According to a preferred embodiment of this invention, it includes controlling means which is inaccessible to unauthorized persons and which is operable by means of an actuator inside the vehicle, and one or more lock controlled actuators accessible outside the car, and which may also be conditioned by still another actuator. Each car door is provided with a latch, the operations of which are controlled by the inaccessible controlling means. The inaccessible controlling means is shiftable to a number of positions, whereby it is adapted to control or condition the present mechanism and certain operative parts of the vehicle. The positions of the controlling means may be at least three in number.

The controlling means preferably has four positions which may comprise two door-unlatching positions and two door-latching positions. In either unlatching position of the controlling means, the car doors are released by their latches. In either latching position of the controlling means, the doors, when closed, are retained by their latches. The controlling means may have other control functions, a number of which shall be set forth as preferred examples. In one unlatching position, the controlling means may be adapted to prevent opening of the car hood, or to prevent removal of a cap for the car fuel tank, or to condition other means of the vehicle. In the other unlatching position, the controlling means may be adapted to permit opening of the car hood or removal of the fuel tank cap, to condition an electrical circuit of the vehicle, or to condition other means of the vehicle. In either latching position, the controlling means may have other controlling or conditioning functions depending on the particular latching position which it occupies. In one latching position, the controlling means may function to condition the ignition and head lamp circuits of the vehicle and other means of the vehicle. In the other latching position, the controlling means may function to lock the vehicle steering column and to condition the ignition circuit, the head lamp circuit, a horn circuit, and a parking light circuit of the vehicle.

This invention also presents other features. The controlling means of the instant mechanism is adapted to be conditioned by movement of a vehicle door or closure. The controlling means may also be conditioned by an actuator inside the car and one or more actuators accessible outside the car, the inside and outside actuators having a novel relation in their operation of the controlling means. The invention also provides a novel release for the vehicle doors in event the doors are locked from inside the vehicle and the latter is in a collision or strikes an obstacle, and the force of the impact is of a predetermined value.

Another novel feature resides in means for supporting and operating the latch members for the vehicle doors. The latch supporting and operating means is relatively simple in construction, is easy to install and service, requires no substantial modification of the car structure, and may be adapted to permit closing of the doors after the latch members are set in door retaining position.

Other novel features relate to a hood latching device and a switch operating device.

It is, therefore, an object of this invention to provide a novel and improved mechanism for preventing the theft of vehicles, and provide safety to occupants of the car on the road.

Another object is to provide a novel mechanism for locking the doors of a vehicle.

Still another object is to provide a mechanism for controlling the locking and unlocking of the doors of a vehicle, and also other functions such as the operation or conditioning of a switch device or a latching means for some part of the car other than a car door.

A further object is to provide novel mechanism for vehicles to control such operative devices as the car hood, the car steering column, the fuel tank cap, and one or more electrical circuits of the vehicle.

A still further object is to provide a novel and improved connecting means between a vehicle door latching means and a remote controller.

Another object is to provide a car door impact release which is operable on the road, but inoperable with the car locked for parking.

A further object is to provide a vehicle control mechanism which is conditioned by movement of a vehicle door or closure.

Still another object is to provide a control mechanism for vehicles by which the operation of an inside actuator is controlled by a second actuator which, for example, may be responsive to movement of a door of the vehicle.

Another object is to provide a control mechanism for vehicles by which the operation of an actuator outside the vehicle is controlled by a second actuator that, for example, may be responsive to movement of a door of the vehicle.

A still further object is to provide control mechanism for vehicles and including an actuator accessible inside the vehicle for controlling latch members associated with the vehicle doors and for also controlling other means, such as a hood latching device.

A further object is to provide a control mechanism for vehicles whereby latches for the doors of a vehicle may be conditioned to door retaining position by an actuator accessible outside the vehicle and without the aid of a key and may be restored to door releasing position by the outside actuator, but only with the aid of a key.

Other objects, advantages and functions of the mechanism of this invention will be obvious from the following description, the appended claims, and the accompanying drawings which illustrate the invention.

Figure 1 is a view of control mechanism embodying the present invention. This figure shows a side elevation of the mechanism in Figures 10 and 12 as viewed from the left side of the vehicle. Figure 1 also includes a diagrammatical illustration of electrical circuits controlled by the present mechanism. Figure 1 shows further the control mechanism when the vehicle is unlocked and the vehicle doors are closed.

Figure 3 is a view similar to that of Figure 1 and shows the control mechanism of this invention with the vehicle locked from the inside and with the car doors closed.

Figure 4 is a detail view showing certain parts of Figure 3.

Figure 5 is a view similar to Figure 1 and illustrates the control mechanism of the present invention when locked from outside the vehicle and with the doors closed.

Figure 6 is an end elevational view of the mechanism shown in Figure 5, a portion of Figure 6 being shown in cross section for purposes of illustration. The structure of Figure 6 is duplicated, in reverse arrangement, on the opposite side (right side of the car as shown in Figure 10.)

Figure 7 is a view similar to Figure 1 and shows the control mechanism with the car unlocked and a car door open.

Figure 8 is a detail view of parts shown in Figure 7.

Figure 10 is a top plan view of control mechanism embodying this invention. This view includes two actuators at opposite sides of a vehicle and accessible outside the vehicle, an actuator accessible inside the vehicle, actuators responsive to movements of the front car doors, and inaccessible controlling means.

Figure 11 is a detail view of the control for the operation of the steering column of a vehicle in accordance with this invention.

Figures 12, 13:
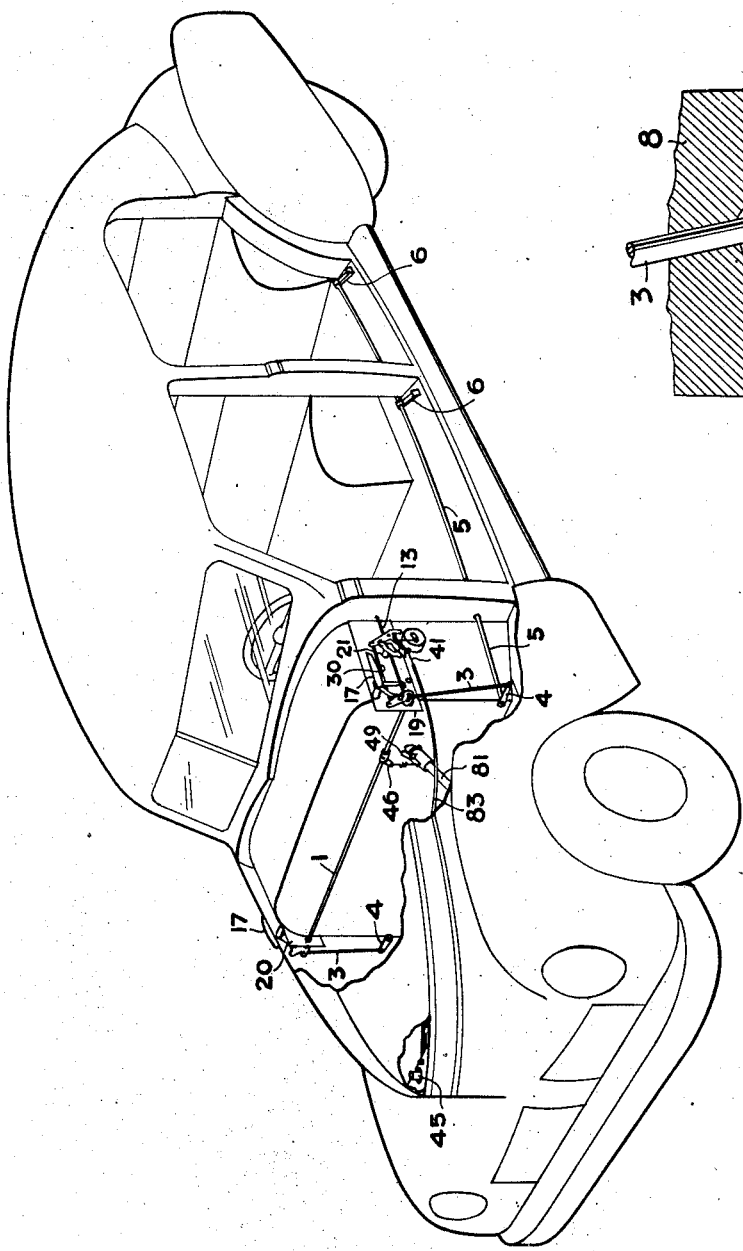

Figure 12 is a perspective view of an automobile provided with a control mechanism embodying this invention. Certain conventional parts of the vehicle are omitted or broken away for purposes of illustration. The door latches are in released position.

Figure 13 is a view of a modification of door latching means embodying this invention.

In each of the Figures 1-13 of the accompanying drawings, parts are broken away for purposes of illustration and to facilitate an understanding of this invention.

The present invention is illustrated in the accompanying drawings as installed in a four door sedan or pleasure car, but obviously is adapted for use in other types of vehicles, including both pleasure and commercial vehicles.

In a preferred embodiment and as illustrated in the accompanying drawings, the mechanism of this invention may comprise two actuators 17 accessible from outside the vehicle, an actuator 22 accessible within the vehicle, and a latch or locking member 6 for each of the four doors or closures 8 of the vehicle. The two outside actuators 17 are preferably positioned at opposite sides of the vehicle for convenient operation by the driver in leaving or entering the vehicle through either front door 8. The actuator 22 is positioned inside the car body and within convenient reach by the person occupying the usual driver's seat.

The latch members 6 are simultaneously and similarly operated by either of the outside actuators 17 under certain conditions, or by the inside actuator 22 under certain conditions, or by a front door 8, under certain conditions. When the driver is inside the car or vehicle, he may operate the inside actuator 22 to position the door latch members 6 in either a first unlatching position (Figures 1 and 2) or a first latching position (Figures 3 and 4). When the driver is outside the car, he may operate either of the actuators 17, under certain conditions, to position all of the door latch members 6 in either their first unlatching position (Figures 1 and 2), or a second latching position (Figures 5 and 6). When one of the front doors 8, for example the driver's door, of the car is opened, it is effective, through means hereinafter described, to set the control mechanism so that all the latching members 6 are placed in a second unlatching position which is illustrated in Figures 7 and 8. In either unlatching position of the latch members 6, all the doors 8 are released, and in either latching position of the latch members 6, all of the closed doors 8 are retained in closed position.

*Outside actuators*

When the driver is outside the vehicle, he may latch and unlatch the doors 8 of the vehicle by operating either of the outside actuators 17. In a preferred embodiment of this invention, the two actuators 17 are similarly constructed, perform the same functions, and operate the latch members 6 in the same manner. It will, therefore, be sufficient for an understanding of this invention to describe only one of the outside actuators 17 and the manner in which it controls the latch members 6.

Each of the actuators 17, according to the accompanying drawings, is located outside the car and adjacent a front car door 8. The actuators 17 are supported by the chassis for the present mechanism. This chassis may comprise two plates 19 and 20 arranged at opposite sides of the car and in inaccessible positions as illustrated by Figures 10 and 12, for example. Each plate (19 and 20) is secured to a stationary part of the car, such as the inner side wall extending forwardly from the dashboard and into the compartment housing the car motor as shown in Figure 12.

Each of the actuators 17 has an integral sleeve 85 which extends from the actuator (17) and through a suitable opening in the outer side wall or cowling of the car and carries fingers 16 and 18 integral with itself. Each sleeve 85 receives and is secured to one end of a shaft 87. Each shaft 87 is journaled in a bearing 86 which is carried by the corresponding chassis plate (19 or 20). Each actuator 17 is, therefore, located outside the car and pivotally supported by a corresponding, inaccessible chassis plate (19 or 20), while the fingers 16 and 18 operate in a vertical plane within the car hood or cowling. Each actuator 17 is normally in a horizontal position and free to be raised by the driver. When released from a limiting position, the actuator 17 may be returned to the horizontal position by a conventional spring device (not shown).

A key controlled lock 51 is provided for each of the two actuators 17. As the two locks (51) are similar in construction and control their respective actuators 17 in the same manner, a description of one lock 51 and its operation will be sufficient for both of the locks 51. The lock 51 is supported by the corresponding chassis plate (19 or 20). The outer or key-hole end of the lock 51 is accessible through, or extends through, a suitable aperture in the adjacent car wall or cowling and adjacent the corresponding actuator 17.

An inaccessible dog or latch 52 is provided for each lock 51. The dog 52, when moved from its normal upstanding position, pivots about the axis of its lock 51. The dog 52 can only be shifted (counterclockwise) to the dotted line position of Figure 5 when the lock 51 is operated by a key. When the key is turned to the lock released position, the dog 52 returns to its upright position and is locked against counterclockwise movement. The dog is free to yield towards the right (in a clockwise direction) against the action of a spring and is returned by the spring from its right position to its upstanding position. In its normal or upstanding position, the dog 52 is in the path of movement of the finger 18 of the respective actuator 17 (see Figure 1 for example). When a lock 51 is operated by a key, the corresponding dog or latch 52 is shifted to the dotted line position of Figure 5 and permits the finger 18 to pass as the actuator 17 is depressed from its horizontal position. When the key is turned to locking position or withdrawn from the lock 51, the dog 52 is returned to the full line position of Figure 5. The dog 52 now prevents the respective actuator 17 being depressed until a key has again been inserted into the lock 51 and operated to release the dog 52. If the dog 52 is in its normal (locking) position when the actuator 17 returns from its lowered position to its horizontal position, the finger 18 forces the dog 52 towards the right until the finger 18 has passed the dog 52. The dog 52, under the action of its spring, then returns to its normal position in the path of the finger 18 and prevents the actuator 17 being depressed until the lock 51 is again operated by a key.

In lieu of the locks 51 and dogs 52, the actuators 17 may each be provided with a key controlled lock of the type shown in my Patent No. 2,235,830.

*Latch operating means under control of outside actuators*

The present mechanism includes an inaccessible control means which operates the latch members 6 and which, under certain conditions, may be operated by either of the outside actuators 17. The inaccessible control means may comprise a shaft 1 and two crank or rock arms 2.

The shaft 1 is mounted in an inaccessible position within the car, and may be mounted under the hood or cowling as illustrated in Figure 12 for example. The shaft 1 adjacent its ends may be journaled in the two plates 19 and 20. A crank arm 2 is rigidly secured to each end of the shaft 1, each of the crank arms 2 being arranged between the adjacent plate (19 or 20) and the car hood or cowling. The two crank arms 2 have the same construction and are similarly operated by their respective actuators 17. Each of the two crank arms 2 is also similarly connected to the door latches 6 at the corresponding side of the car or vehicle. It will, therefore, only be necessary to explain the construction and operation of one of the crank arms 2 and its latch operating connections.

The crank arm 2 carries a pin or stud 15. When the crank arm 2 is positioned by an open front door, as illustrated in Figure 7, its pin 15 is in the path of movement of the finger 16. The finger 16, therefore, is operative, when shifted, to engage the pin 15 and thereby shift the crank arm 2. When an actuator 17 is raised from normal position and the corresponding pin 15 is in the path of movement of the corresponding finger 16, the corresponding crank arm 2 is actuated and both of the crank arms 2 are shifted to the position illustrated in Figures 5 and 6. When the crank arms 2 are in the position of Figures 5 and 6, each of their pins 15 is in the path of movement of the corresponding finger 18. The crank arms 2 may, therefore, be shifted from the position of Figures 5 and 6 to the position of Figures 1 and 2 by unlocking either one of the dogs 52 with a suitable key and lowering the corresponding actuator 17 from its normal horizontal position. As both of the crank arms 2 are rigidly secured to their common shaft 1, both of the crank arms 2 have the same movement, when either is operated.

Each of the crank arms 2 is connected by a link 3 to a crank arm 4 which is rigidly secured to one end of a latch operating or rock shaft 5. Each of the two shafts 5 carries one or more latch members 6 (see Figure 12). A crank arm 2 and its connecting link 3, in effect, provide a toggle for the corresponding latch operating shaft 5. As the crank arms 2 are shifted between latch releasing and latch retaining positions, the crank arms 2 and their links 3 pass through the dead center position. For example, when the crank arms 2 are shifted from the position of Figure 7 to the latching position of Figure 5, the links 3 move past the axis of the shaft 1. The connection between each crank arm 2 and its corresponding latch operating shaft 5 now precludes shifting of the crank arms 2 to unlatching position by reason of tampering with the latch members 6. Each of the crank arms 4 is provided with a spring 38 to exert a downward pull on the corresponding link 3 and thereby bias the crank arms 2 on one or the other side of dead center. So located, springs 38 are also effective to maintain all connections between moving parts under stress, minimizing any tendency to rattle.

Each rock shaft 5 is a rod-like element, preferably straight and adapted to be sprung within its elastic limit to follow the curvature of doors or body. Their rigidity to torque is relative, but they must be sufficiently rigid in torsion to shift their latch member 6, under normal operating conditions, through operation of their crank arms 4.

Each latch member 6 is so secured to its operating shaft 5 that it (6) is positioned below and adjacent the corner of the door 8 remote from its hinge. Each door 8 is provided with a member 7, Figures 5 and 6, on its lower corner, designed to engage a member 6 when the latter is raised. The member 7 is pivotally mounted on a pin or trunnion 9 carried by the door 8 and urged downward by spring 10. When a door 8 is closed, with its latch member 6 in raised position, the member 7 rides over the member 6 and compresses spring 10. When the door is fully closed, the spring 10 forces member 7 into engagement with latch member 6.

Figures 1, 2:
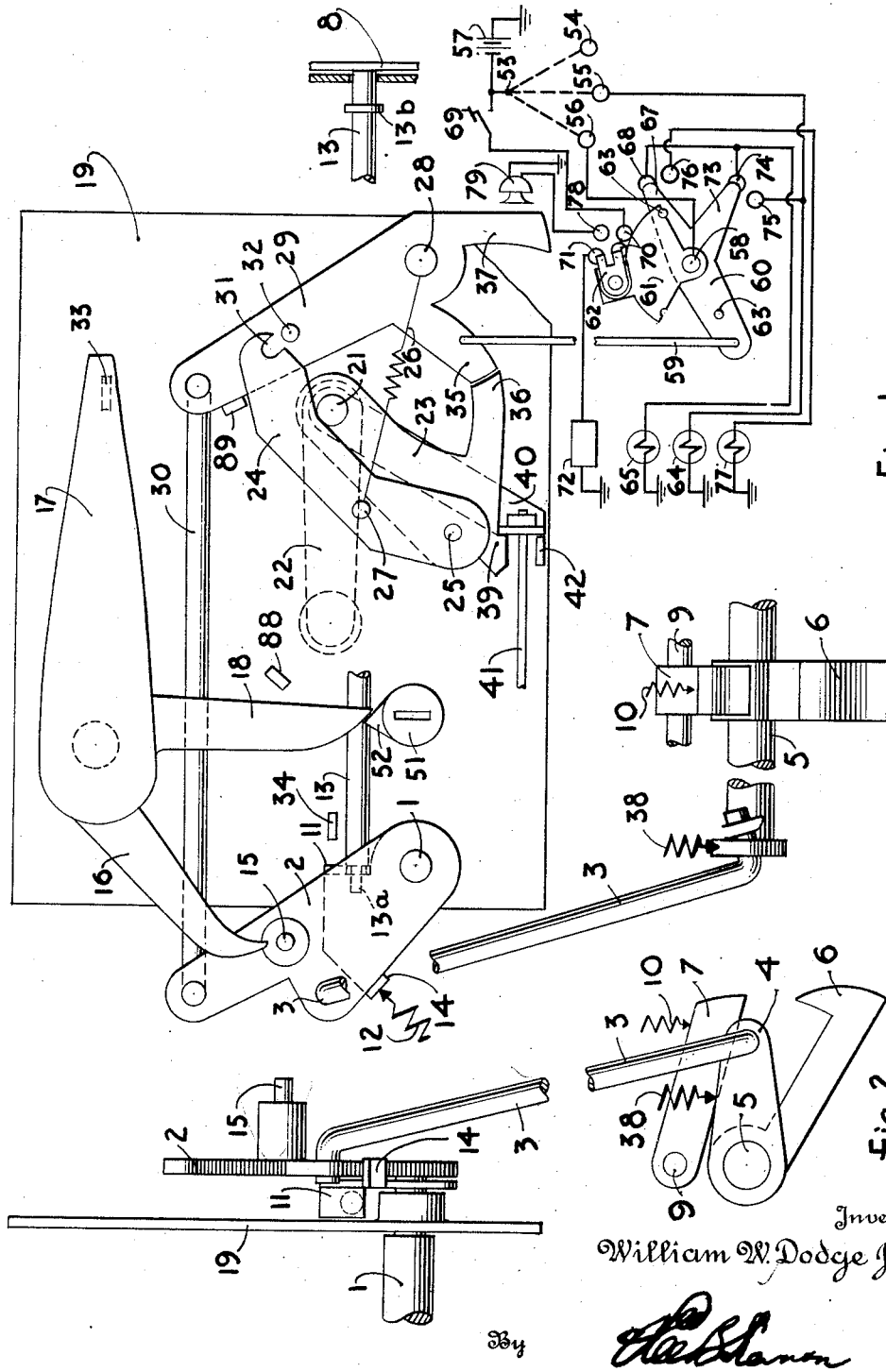
Figure 2 is an end elevational detail view taken at the left of Figure 1.

In lieu of the spring pressed, pivoted member 7, the doors 8 of the vehicle may each be provided with a member or latch keeper 7a as shown in Figure 13. Each latch keeper 7a is rigidly secured to its door. The spring 10 of Figure 2, is, therefore, omitted in the Figure 13 construction. When the latch keepers 7a are rigidly supported as in Figure 13, the rock shafts 5 are formed as resilient rod-like elements so that they may twist within their length. When a latch member 6 is in a raised or latching position and the corresponding door 8 is shifted to closed position, its rigid latch keeper 7a depresses and rides over the raised latch member 6 and the corresponding shaft 5 of resilient construction yields by twisting within its length. When the door is fully closed, the resilient shaft 5 returns the depressed latch member 6 to its raised or latching position. The spring pressed, pivoted type of door supported member 7 may also be used with rods 5 of the resilient form just described, the engaging members (6 and 7) being mutually yielding.

One shaft 5 is provided at each side of the car and carries latch members 6 for the doors on the same side of the car. Each shaft 5 extends rearwardly from its crank arm 4 near and essentially parallel to the door bottoms. It is to be noted that the shafts 5 need not enter any major structural member such as the mullion between a front and rear door, nor the reinforcing of the front door jamb but may pass inside them as shown; or outside of them when door construction is such as to render them inaccessible when the doors are closed.

Control of door latches by inside actuator

The inside actuator 22 is operatively secured to one end of a shaft 21, which is supported by and journaled in one of the chassis plates, for example the plate 19 at the left side of the car. The inside actuator 22 is preferably positioned within convenient reach of the driver when in the driver's seat, and may be arranged adjacent the inside car wall and below the dashboard. The shaft 21 extends through the adjacent inner car side wall and is journaled in the plate 19. The outer end of the shaft 21, that is the end remote from the actuator 22, extends beyond the plate 19. This outer end of the shaft 21 supports two arms 23 and 40. The arm 40 is freely rotatable on the shaft 21 and is provided for a purpose hereinafter described. The arm 23 is operatively secured to the shaft 21 for movement therewith upon operation of the inside actuator 22. A link 24 is pivotally mounted on the arm 23 by means of a pin 25. A tension spring 26 is secured at one end to a pin 27, which is carried by the link 24, and at its other end to a shaft 28 which is journaled in the plate 19. The spring 26 yieldingly urges the link 24 in a clockwise direction about its pin 25. The spring 26 normally holds the link 24 in contact with the outer end of the shaft 21, as shown for example in Figures 7 and 9.

The shaft 28 supports a rock or crank arm 29, which is provided with a pin 32 and two extensions or stops 35 and 37. The arm 29 is operatively connected to the crank arm 2 at the same side of the car by means of a link 30. By reason of this link 30, the crank arm 29 and the corresponding crank arm 2 are maintained in parallel relation and have the same movement, when either of the arms 2 or 29 is shifted. A stop 88 limits movement of an arm 2 in one direction and a stop 89 limits movement of the arm 29 in the other direction. The stops 88 and 89, therefore, determine the limits of maximum movement for each of the arms 2 and 29 and the elements connected thereto, including the latch members 6.

The arm 29, when in the position illustrated by Figure 1, has its extension or stop 35 arranged in the path of movement of an extension 36 on the arm 23. The extension or stop 35 is then effective to prevent the inside actuator 22 being lowered from its normal or horizontal position. The inside actuator 22, however, is free to be raised from its horizontal position. When the arm 29 is set as illustrated in Figure 1 and the inside actuator 22 is raised, the link 24 moves about shaft 21 as an axis until a notch 31 in the link 24 engages the pin 32 which is carried by the arm 29. The pin and notch connection (32, 31) then provide an operative connection, whereby continued rotation of the inside actuator shifts the arm 29 from the position of Figure 1 to the position of Figure 3. When the position of Figure 3 is reached, a fixed stop 33, which is secured to the plate 19, engages a shoulder 39 on the arm 23 and prevents further movement of the inside actuator 22 in the same direction. This operation by the inside actuator 22 results in both of the crank arms 2 being shifted to move all of the latch members 6 to their first latching position (Figures 3 and 4).

The spring 26 maintains the notch 31 in engagement with the pin 32, when the arm 29 is being controlled by the inside actuator, and also urges the arms 23 and 29 to the limit position in which the arm 23 rests against the stop 33. The link 24 is so designed and associated with the arms 23 and 29 that the strain during their joint operation is at all times essentially tangent to the arc through which the pin 32 moves and there is no resulting tendency for the pin and notch (32, 31) to disengage.

The car has now been locked from the inside and all the doors and closures of the car are retained in the closed position.

In order to leave the car, the driver rotates the inside actuator 22 in a reverse direction (anticlockwise looking at Figure 3) until it reaches the position illustrated in Figure 1 and further movement is arrested by engagement of the two extensions 35 and 36.

When an outside actuator 17 is operated to lock the car doors, it shifts the crank arms 2 to the position of Figure 5 and thereby shifts the arm 29 to position the arm extension 37 in the path of movement of the extension 36 (see Figure 5). The car is now locked from the outside, and the extensions 36 and 37 of the arms 28 and 29 prevent the inside actuator 22 being lowered from the horizontal position. The actuator 22, however, is free to be raised, but is ineffective to shift the arm 29, since the notch 31 of the link 24 cannot engage the pin 32 of the arm 29.

*Control by door*

In a preferred embodiment of this invention, the mechanism is controlled by one or more of the car doors. For the purpose of illustrating a preferred form of the invention, the accompanying drawings show a construction whereby either of the two front doors of a car is adapted in its opening and closing movements to control the present mechanism. Each of the two front doors controls a set of operative connections for the crank arm 2 on the same side of the car. As the two sets at opposite sides of the car are the same in construction and operation, only one of the two sets need be described.

A rod 13 extends through and is supported by the forward section of the front door frame so that the rearward end of the rod 13 is adapted to engage the forward or hinged edge of a closed door 8 (see Figures 1, 3 and 5). This forward edge of the car door 8 is adapted to swing in an arc about the door hinge and toward and away from the adjacent end of the rod 13. The rod 13 is adapted to be reciprocated longitudinally and carries a stud 13a at one end extending through a slot in flange 84 (see Figure 10) of a plate 11 as means of support. The shoulder at the forward end of the rod 13 abuts the flange 84 of the plate 11. This plate 11 is rotatably mounted on the shaft 1 so that the plate 11 and the shaft 1 may (under certain conditions) move independently of each other. A spring 12 is provided to urge the plate 11 toward the rod 13 and the flange 84 into engagement with the forward shoulder of the rod 13, and a collar 13b serves to limit the movement of the rod 13 when the door 8 is opened.

It is now convenient to assume that the car doors are closed and unlatched, and that the mechanism is set as illustrated in Figure 1. When one of the front doors 8 is opened, the corresponding rod 13 and its plate 11 are shifted by the corresponding spring 12 until the plate 11 is arrested by a fixed stop 84 which is carried by the chassis plate (19, 20) and collar 13b reaches the door frame. During this movement of the plate 11 under the action of its spring 12, a flange 16 on the plate 11 engages and shifts the adjacent crank arm 2 to the position of Figure 7. The spring 12 is effective to produce this movement of the crank arm 2 and the plate 11, as either of the springs 12 is sufficient to overcome the combined force of the two springs 38. Each spring 38, however, is effective to yieldingly maintain its shifted crank arm 2 in engagement with the flange 16 of the shifted plate 11. It will now be understood that with a front door open, the respective plate 11 abuts against the stop 84 and the two crank arms 2 are placed in the position (second unlatching position) illustrated by Figures 6 and 7. When the crank arms 2 are in the position illustrated by Figure 7, all of the latch members 6 are in a second unlatching position which is illustrated in Figure 3.

The mechanism with the setting provided in Figure 7, by reason of the opening of a front car door, is now conditioned for certain operations. The pins 15 on the crank arms 2 are now in the path of movement of the fingers 16. The driver, therefore, may lock the car from the outside by first raising one of the outside actuators 17 and then closing the open door.

In the setting illustrated by Figure 7, it will also be noted that the arm 29 is set in a position in which neither of its extensions 36 and 37 is in the path of movement of the extension 36 on the arm 28. The inside actuator 22 is, therefore, free to be depressed by manual operation. This movement of the inside actuator 22, which is independent of its door latch operating movement, may be used to control certain parts of the vehicle. For example, connections (see Figure 9) may be provided between a latch 44 and the inside actuator arm 23, so that the latch 44 is withdrawn to released position when the inside actuator 22 is lowered. The latch 44 may be adapted for latching engagement with a grooved pin or keeper 45. The latch 44 and pin 45 may be used for latching the car hood, the fuel tank cap, or any other closure or removable part of the car. When used for latching the car hood, the pin 45 may be secured to the car hood and the latch 44 suitably mounted on a stationary part of the car. A spring 43 is provided to urge the latch member 44 into the groove of the pin 45 for securing the hood in closed position. The latch member 44 is operatively connected to the arm 40 by means of a flexible wire or cable 41. This wire or cable 41 may, if desired, be slidably disposed in a protective housing or tubular conduit 83, which may be of flexible construction and suitably secured to the car. One end of the wire or cable 41 is securely attached to the latch member 44 and the other end thereof extends through a flange 82 on the arm 40. A nut or clamp is secured to the last named end of the wire or cable 41, so that when the arm 40 is rocked anti-clockwise (Figure 9), it carries with it the adjacent end of the wire 41 and thereby draws the latch member 44 against the action of the spring member 43 and into a position to release the car hood. When the latch 44 is in the latching position, the flange 82 on the arm 40 abuts the fixed stop 42 as illustrated in Figure 7.

Figure 9:
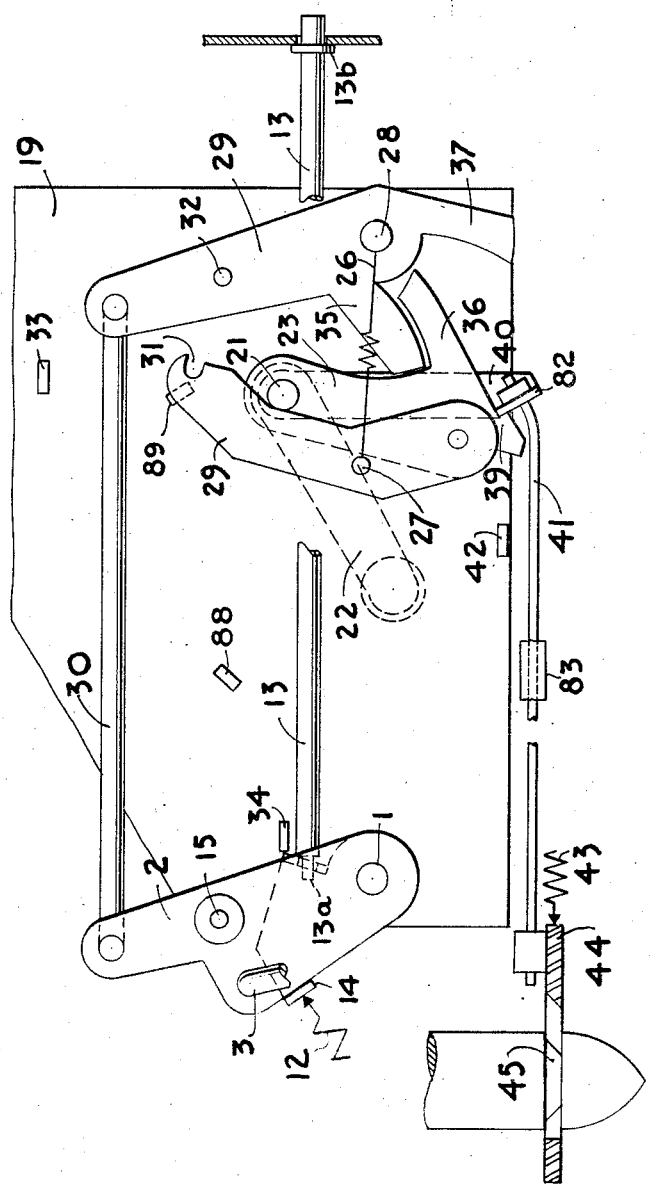
Figure 9 is a detail view of the control mechanism of this invention with the car unlocked, a door open, and the inside actuator operated to release a latch other than a car door latch.

When the inside actuator 22 is lowered from its horizontal position by the driver, it operates the arm 29, and a shoulder 39 on the arm 23 engages the flange 82 on the arm 40. The arm 29 will, therefore, carry with it the arm 40 as illustrated in Figures 7 and 9 and thereby shift the latch 44 to the unlatching position (Figure 9). The car hood is now free to assume an open position under the action of conventional spring means not shown. When the inside actuator 22 is in the position of Figure 9 and is released by the driver, the spring 43 is effective to restore the actuator 22 and the arms 40 and 29 to the positions illustrated in Figure 7. The latch 44 is now returned to hood latching position.

It will now be assumed that the mechanism is set as illustrated in Figure 7 and all of the car doors, except one front door, are closed. When the open front door 8 is closed, it forces its rod 13 and the corresponding plate 11 to the left and against the action of the spring 12. At the same time, the two springs 38 will shift the crank arms 2 forwardly and the mechanism will be set as illustrated in Figure 1. Inside actuator 22 is, then, the only means to unlatch the hood, and is ineffective to do so at all times the doors are closed.

*Steering column control*

The steering column 81 of the vehicle may be provided with a locking or holding means comprising a pivotally mounted dog 49 and a notched ring 80 (Figures 11 and 12). The notched ring 80 may encircle the steering rod 81 and is rigidly secured thereto. The dog 49 is pivotally mounted on a convenient, stationary part of the car. The dog 49 is adapted to be actuated by the shaft 1. For this purpose, a sleeve 145 is mounted on the shaft 1 and has a rigid arm 46 which is operatively connected by a linkage 47 to the dog 49 as illustrated in Figure 11. The linkage 47 preferably includes a spring 48 to provide a yielding connection between the arm 46 and the dog 49, seating the dog in the first notch which may register with it. The shaft 1 operates the sleeve 145 through the intermediary of a lost motion connection. This connection comprises a pin 143 which is rigidly secured to the shaft 1 and which extends into a slot 144 that is formed in the sleeve 145. This pin and slot connection (143, 144) is such that the shaft 1 is only effective to shift the dog 49 into engagement with the notched ring 80 when the crank arms 2 are passing beyond their first latching (door retaining) position (Figures 3 and 4) to their second latching (door retaining) position (Figures 5 and 6). The pin and slot connection (143, 144), therefore, provides lost motion between the shaft 1 and the sleeve 145 when the crank arms 2 are traveling through an angle equal to their angular movement between first unlatching (door releasing) position (Figures 1 and 2) and first latching (door retaining) position (Figure 4). The described lost motion prevents the steering column 81 being locked by the dog 49, except through operation of an outside actuator 17. When an outside actuator 17 is operated to release the car doors, the shaft 1 traverses its pin 143 from one end of the slot 144 to the other end. Then as the shaft 1 continues its movement to set the crank arms 2 in the position of Figure 1, the pin 143 is effective to shift the sleeve 145 for operating the dog 49 to release the steering column 81.

*Control of electrical devices of the vehicle*

The mechanism of this invention is adapted to control coincidentally a number of conventional electrical devices which are usually provided in a vehicle. These electrical devices may comprise a parking lamp or light 64, the car headlights 65, an auxiliary light 77, the ignition system for the car motor 72, and a horn 79. The auxiliary light 77 may be either a dome light for the interior of the vehicle, or a step light for the running board of the vehicle. The circuits for the several electrical devices may include a battery 57, a manually controlled switch 53 of conventional form, and a manually controlled switch 69. The switch 69 may be provided with a key controlled lock of conventional construction. One terminal of the battery 57 is grounded and the other terminal is connected to one side of the switch 53 and also to one side of the switch 69. The switch 69 is adapted to close the circuit between the battery 57 and two contacts 70, which are connected in series relation. A manually operated arm of the switch 53 is movable into contact with any one of the contacts 54, 55 and 56. When the switch arm is on contact 54, it is in the off or open circuit position. The contact 55 is electrically connected with a contact 75 and also with one terminal of the parking light 64, the other terminal of the parking light 64 being grounded. The contact 56 is electrically connected with a shaft 58 which is a good conductor of electricity.

The auxiliary light 77 has one terminal grounded and the other terminal electrically connected to a contact 76, so that when the contact 76 is connected to the battery 57, the auxiliary light 77 is energized.

The head lamp or lamps 65 may have one terminal grounded and the other terminal electrically connected to two contacts 68 and 74 arranged in parallel circuit relation. When one or both of the contacts 68 and 74 are connected to the battery 57, the head lamp or lamps 65 are energized.

One terminal of the ignition system for the motor 72 is grounded and the other terminal for the system may be electrically connected to a contact 71. When the contact 71 is electrically connected to one of the contacts 70, in the manner hereinafter described, the ignition system for the motor 72 is placed under the control of the manually operated switch 69.

One terminal of the horn 79 is grounded and the other terminal is electrically connected to the contact 78. When contact 78 is electrically connected to one of the contacts 70, the horn 79 is placed in series relation with and under the control of the switch 69.

The contacts 71 and 78 are adapted to be selectively connected to the contacts 70 by means of an electrically conducting plate 62 having two contact fingers as shown, for example, in Figure 1. When the plate 62 is in the position of Figure 1, it electrically connects one of the contacts 70 with the contact 71 and permits the driver to close the ignition circuit for the motor 72 by operating the switch 69. The conductor plate 62 is shiftable to the position shown in Figure 5 for electrically connecting the second of the contacts 70 with the contact 78. Closing of the switch 69 will now energize the horn 79. This circuit arrangement for the ignition system and the horn permits the driver to leave the car with the switch 69 controlling the horn 79 instead of the ignition circuit for the motor 72. If an unauthorized person attempts to close the circuit across switch 69, he will sound an alarm by energizing the horn 79.

As explained above, the control mechanism of this invention is adapted to control the electrical circuits which have been described. To secure this control, a switch member 60 is mounted on the shaft 58 and is operatively connected to the arm 29 by means of a link 59. The switch member 60 is of material which is a good conductor of electricity, and the link 59 is formed of material which is a non-conductor for electricity. The switch member 60 includes two arms 67 and 73 for engagement with the contacts 68, 75, 74 and 76.

A second switch member 61 is rotatably mounted on the shaft 58 and is adapted to be shifted by the switch member 60 through a lost motion connection. This lost motion connection comprises two pins 63 which are secured to the member 60 and are adapted to engage notches in opposite edges of the switch member 61. The contact plate 62 is securely mounted on the switch member 61. The plate 62 is also electrically insulated from the switch member 61.

It will now be understood that the switch member 60 is shifted whenever the arms 2 and 29 are shifted and that the switch member 60 will, therefore, have four positions of adjustment corresponding to the four positions of adjustment of the crank arms 2. Due to the lost motion connection between the switch members 60 and 61, the switch member 61 and its plate 62 have only two positions of adjustment. The two positions are shown, for example, in Figures 1 and 5.

When the crank arm 2 is in its first position of adjustment (first unlatching or door releasing position), the mechanism and controls are set as in Figure 1. The ignition system for the motor 72 is now connected through the contact 71, the plate 62 and a contact 70 to the ignition switch 69. It will now be assumed that the switch arm of the switch 53 is set on contact 56. As the switch member 60 has its arms 67 and 73 on the contacts 68 and 74 respectively, it closes the circuit between the head lights 65 and the battery 57. As the switch member 60 does not engage the contacts 75 and 76, the circuits for the parking light 64 and the auxiliary light 77 are now open.

When the crank arms 2 are moved to the second position (second unlatching or door releasing position), the controls for the electrical circuits are set in the manner illustrated by Figure 7. The switch member 61 and the plate 62 remain in the same position as shown in Figure 1, and the ignition system of the motor 72 remains in the circuit of the switch 69. The switch member 60, however, has been shifted to its second position, so that its finger 67 engages the contact 76 of the circuit for the auxiliary light 77 and the contact arm 73 engages the contact 75 of the circuit for the parking light 64 breaking the circuit through head light 65.

When the crank arms 2 are in the third position (first latching or door retaining position), the switch member 60 is in the position illustrated in Figure 3. The finger 67 of the switch member 60 now engages the contact 74 of the circuit for the head lamp 65 which will be energized when the switch arm of the switch 53 is set on contact 56. Movement of the switch member 60 to its third position from either its first position or its second position does not disturb the setting of the switch member 61 and its plate 62. The motor 72 is, therefore, still under the control of the switch 69.

When the crank arms 2 are in a fourth position (second latching or door retaining position), the switch member 60 is in its fourth position, which is illustrated in Figure 5. The arm 67 engages the contact 78 to close the circuit between the parking light 64 and the contact 56. The circuits for the head light 65 and auxiliary light 77 are now open. When the switch member 60 shifts from its third position (Figure 3) to its fourth position (Figure 5), one of the pins 63 engages the notch in the left edge of the switch member 61, causing the switch member 61 to be shifted to the position of Figure 5. The switch member 61 now positions the plate 62 for engagement with one of the contacts 70 and the contact 78 to place the horn 79 in circuit with the switch 69 and break the ignition circuit to the switch 69.

The switch members 60, 61, the plate 62 and the contacts 70, 71, 78, 68, 76, 74 and 75 may be enclosed in a suitable housing which may be mounted on the chassis plate 19. The switch assembly, as shown in Fig. 12, is positioned closely adjacent the controller and therefore, like the controller, is normally inaccessible when the engine hood is closed and latched.

If desired, the usual floor switch (not shown) may also be provided to shift the head lights 65 between high and depressed beams.

Operation

In explaining the operation of the illustrated invention, it will be helpful to assume that the driver is inside the car and in the driver's seat, that all doors are closed, and unlatched (released), and that the mechanism and controls are set as illustrated in Figures 1 and 2.

The crank arms 2 and the latch members 6 are in their first unlatched (door releasing) position. The hood is latched. The crank arm 29 and the switch member 60 are in positions corresponding to the setting of the crank arms 2. At this time, the inside actuator 22 may be raised to latch the car doors 8, but is prevented from being depressed to unlatch the hood by reason of the engagement of the extensions 35 and 36. The steering column 51 is released for steering the car, as the dog 49 is in the position illustrated in full lines by Figure 11. The dog 49 cannot be controlled by the inside actuator 22 by reason of the lost motion connection (143, 144). As the plate 62 engages the contact 71 and one of the contacts 70, the ignition system for the motor 72 is under the control of the switch 69. The driver, therefore, may start the motor upon closing the switch 69. If the switch arm of the switch 53 is set on the contact 56, the circuit for the head lamps 65 is closed, and the circuits for the parking light 64 and the auxiliary light 77 are open. The driver may open the head lamp circuit and close the parking light circuit by moving the switch arm of the switch 53 from contact 56 to contact 55.

The outside actuators 17 may now be raised by an individual outside the car, but are inoperative to lock the car, since the pins 15 carried by the crank arms 2 are not in the path of movement of the corresponding fingers 16. As the dogs 52 are locked in the path of movement of the respective fingers 18, the actuators 17 may not be lowered.

Locking of doors from inside car

With the driver inside the car, the car unlocked, and the doors closed, the mechanism is set as illustrated in Figure 1 and the driver may proceed to lock all the doors 8 from inside the car. This inside locking is accomplished by raising the inside actuator 22 from the position of Figure 1 to the position of Figure 3. As the actuator 22 is rotated, it moves the link 20 so that its notch 31 engages the pin 32 on the crank arm 29. Continued movement of the inside actuator 22 shifts the arm 29 to the position of Figure 3. The mechanism is yieldingly held in the set position of Figure 3 by the action of the spring 26 and the springs 30. The arm 29 has shifted the crank arms 2 to the position of Figure 3 for placing the latch members 6 in the first latching (door retaining) position, which is illustrated in Figure 4.

All doors are now closed and locked from inside the car. The hood remains latched, and the steering column remains free for normal steering operations by the driver. The dogs 52 are locked in the path of movement of the respective fingers 16 to preclude the door latch members 6 being operated by the outside actuators 17. While the actuators 17 are free to be raised from outside the vehicle, this movement in no way affects the setting of the crank arms 2.

The contact plate 26 now engages contacts 71 and 70 (Figure 3). The motor 72 is under the control of the switch 69, and the horn 79 is disconnected from the switch 69. The driver may turn on his head lights 65 by shifting the arm of the switch 53 into engagement with the contact 56. If the driver desires to use his parking light 64, he places the arm of the switch 53 on the contact 55. The inside actuator 22 remains in the set position of Figure 3 as long as the driver desires the car doors 8 to be locked from inside the car.

Operations controlled by door of vehicle

When the driver is in the car with all doors 8 closed and latched, he may release the hood latch 44 by performing three operations. The inside actuator 22 is returned to the horizontal position of Figure 1 to release the car doors 8. Then one of the front car doors 8 is opened in order to set the arm 29 so that neither of its extensions 35 and 37 is in the path of movement of the extension 36 to prevent depressing of the inside actuator 22. The inside actuator 22 is now depressed from the horizontal position of Figure 7 to the position of Figure 9, and the latch 44 is retracted to hood releasing position.

When a front door 8 is in the open position, the arm 29 is so set that its pin 32 may not be engaged by the notch 31 of the link 24. Therefore, when a front door 8 is open, the latch members 6 cannot be operated by the inside actuator 22 to lock the doors 8.

If the switch arm of the switch 53 is set so as to be in engagement with the contact 56, the opening of one of the front car doors 8 results in the opening of the circuit for the head lamps 65 and the closing of the circuits for the parking light 64 and the auxiliary light 77. As previously explained, the light 77 may be either a dome light or a step light.

When the inside actuator 22 is released from the position of Figure 9, the spring 43 is effective to return the inside actuator 22 to the position of Figure 7. If the driver's door is open, the mechanism is now set as in Figure 7. Closing of the driver's door will set the mechanism as illustrated in Figure 1, whereby the parking light (64) circuit and the auxiliary light (77) circuit are opened and the circuit of the head lamp 65 is closed. The car doors 8 now being closed, the extension 35 is in the path of movement of the extension 36 and the inside actuator 22 is precluded from unlatching the hood.

The depressing of the inside actuator 22, which is possible when a front car door 8 is unlocked and in the open position, may be adapted to control any device which usually is operated only when the car is parked and a car door may be opened. For example, the inside actuator, in lieu of controlling the latch 44, might control a valve in a fluid pressure or vacuum system for raising or lowering the movable top of an open type pleasure car.

Locking of car from outside

It is now assumed that the driver is in the car with the doors unlatched (Figures 1 and 2) and desires to get out of the car and then lock it. He may leave the car by opening the driver's door. This movement of the driver's door operates to open the head light (65) circuit and closes the parking (64) light circuit, at the same time closing auxiliary light circuit (77); and sets the mechanism as illustrated in Figure 7 so that the doors 8 may be latched from outside the car. The latch members 6 and the crank arms 2 are now in the second unlatching position, and each of the pins 15 is in the path of movement of the respective finger 16. While a front door 8 is in the open position, one of the outside actuators 17 is raised so that the corresponding finger 16 will engage its pin 15 to shift the crank arms 2 from the position of Figure 7 to the position of Figure 5. The crank arms 2 and the latch members 6 are now set in their fourth position (second latching or door retaining position). When the operated actuator 17 is released by the driver, it will return under the action of its spring to the position shown in Figure 5. As the dogs 52 are locked and in the path of movement of their respective fingers 18, the outside actuators 17 cannot be lowered below horizontal to release the car doors 8.

The open driver's door is now closed. If the door has a pivoted dog 7, the latter is raised by the corresponding latch member 6 as the door closes. When the door is fully closed, its spring 10 returns the dog 7 to its lowered normal position for latching engagement with the corresponding latching member 6.

If the door being closed has a rigid latch keeper 7a as in Figure 13, the keeper 7a depresses its latch member 6 from latching position to an out-of-the-way position. Although the latch member 6 is shifted by closing movement of the car door, the setting of the crank arms 2 is not changed. The inherent resiliency of the shafts 5 permits the latch members 6 to be depressed while the crank arms 2 remain in latching position. When the driver's door is fully closed, its latch member 6, under the spring action of the shaft 5, is returned to the latching position of Figure 6 to retain the door in the closed position.

When the doors are locked from outside the car, the inside actuator 22 cannot actuate the controller 1 and its controlled devices; likewise it is inoperative to unlatch the hood. Hence there is no means within the car to unlock the doors or tamper with related devices; and the only means of actuation of the system is by an outside actuator 17 and with the aid of the key.

In locking the car from the outside, starting with the doors closed and unlatched from the inside, it will be noted that each crank arm 2 moves from its first unlatching position (Figures 1 and 2), through its second unlatching position (Figures 7 and 8), through its first latching position (Figures 3 and 4), and to its second latching position (Figures 5 and 6). As the crank members 2 pass from their first unlatching position (Figures 1 and 2) to their first latching position (Figures 3 and 4), the pin 143 (Figure 11) moves in the slot 144, and the dog 49 remains in the full line position of Figure 11 free of the steering column 81. However, as the crank arm 2 passes from the first latching position (Figures 3 and 4) to the second latching position (Figures 5 and 6), the pin 143 is effective to drive the sleeve 145 and cause the dog 49 to engage the notched ring 80 of Figure 11 to lock the steering column 81 against unauthorized operation.

It is also to be noted that as the crank arm 2 passes from first unlatching position (Figure 1) to the first latching position (Figure 3), the switch member 60 is shifted without changing the setting of the switch member 61. However, as the crank arm 2 moves from the first latching position to the second latching position, the switch member 60 shifts the switch member 61 from the position of Figure 3 to the position of Figure 5. The shifting of the switch member 61 results in the opening of the circuit between the motor 72 and the switch 69 and the closing of the circuit between the horn 79 and switch 69.

The car is now locked from the outside, and unauthorized persons cannot enter the car, start the motor 72, open the hood, nor operate the steering column 81. If an unauthorized person attempts to enter the car, as by breaking a car window, and to start the motor by closing the switch 69, the horn 79 will be sounded as an alarm. As the extension 37 on the arm 29 is in the path of movement of the extension 36, the inside controller 22 cannot be operated to withdraw the latch 44 to hood releasing position. Since the arm 29 is now in the position illustrated by Figure 5, its pin 32 is in a position where it may not be engaged by the notch 31, in the event the inside actuator 22 is raised. The inside actuator 22 is thus inoperative to control the latch members 6 until the arm 29 is reset by unlocking of the car doors from outside the car.

With the car doors locked from outside the car, the switch member 60 is in the position of Figure 5 to engage the contact 75 in the circuit for the parking light 64 and to open the circuits for the head lights 65 and the auxiliary light 77. If the driver does not desire to use his parking light 64, he opens the parking light circuit before leaving the car by setting the arm of the switch 53 on the contact 54. But with switch 53 on either contact 56 or 55, the parking lights alone light.

If the driver, after operating an outside actuator 17 to position the latch members 6 in door retaining position, fails to shut any one of the car doors 8, any individual can enter the car through the open door, but he cannot start the car, operate the steering wheel, or any other controlled device, except the horn 79.

Unlocking of car from outside

It will now be assumed that all doors 8 of the vehicle are closed and latched and that the mechanism is set as shown in Figure 5. When the driver desires to enter the car, he inserts a proper key into one of the locks 51 and turns the key to rotate the corresponding lug 52 from the full line to the dotted line position of Figure 5. The outside actuator 17, which has been unlocked, is now depressed so that its finger 18 passes the lug 52 and engages its pin 15 to shift the two crank arms 2 from second latching position (Figure 5) to first unlatching position (Figure 1). This movement of the crank arms 2 places the latch members 6 in their first unlatching position, which is illustrated in Figures 1 and 2. The driver then enters the car and closes all the doors.

In unlatching the car doors 8 by operation of the outside actuator 17, the steering column locking dog 49 is returned to its full line position in Figure 11 to release the steering column 81. At the same time, the switching member 61 is shifted from the position of Figure 5 to the position of Figure 1. This shifting of the switch member 61 opens the circuit of the horn 79 and restores the motor 72 to the circuit controlled by the hand switch 69.

As the outside actuators 17 control the steering column dog 49 and the switch member 61 through lost motion connections, the steering column dog 49 and the switching member 61 are not shifted by the outside actuators 17 in their door unlocking operations until the crank arms 2 are close to the limit of their door releasing movement. It will be recalled that the steering column dog 49 is controlled through the lost motion connection 143, 144 and that the switch member 61 is controlled through the lost motion connection (69, 63).

The car doors are now released, the mechanism is set as shown in Figure 1, and the inside actuator may be operated to retain the car doors 8 in closed position in the manner above described.

Impact release

The described mechanism may have, and preferably is provided with, a device for automatically unlocking the car doors in the event the car collides with another car or other obstruction.

This is provided by weighting the handle 22a for the inside actuator 22 of the accompanying drawings. If the weighted actuator 22 is set in door locking position, it will be thrown forward to release the car doors in event of the car being in a collision and being subjected to an impact sufficient to shift the actuator 22. The weighted handle of the actuator 22, however, would be completely inoperative and disconnected from the crank arms 2 and 29 when the vehicle is locked from outside for parking. If doors of the car are locked from the inside by the actuator 22, the latter (22) may at all times be operated manually by the driver to release the car doors. The car doors 8 can always be unlocked from the outside by unlocking one of the locks 51 with a key and operating the corresponding actuator 17, regardless of whether the doors 8 have previously been locked by the inside actuator 22 or by one of the outside actuators 17.

While the accompanying drawings and the foregoing description disclose preferred embodiments of the present invention, it is to be understood that this invention includes all embodiments and modifications coming within the scope of the appended claims.

I claim:

1. In a control mechanism for a vehicle having a closure, the combination comprising: latching means for retaining the closure in closed position, an inaccessible controller, means responsive to movements of said controller for operating said latching means, means for shifting said controller into an unlatching position and a latching position, and means responsive to movement of said closure for shifting said controller from said first unlatching position to a second unlatching position.

2. In a control mechanism for a vehicle having a closure, the combination comprising: latching means for retaining the closure in closed position, an inaccessible controller, means responsive to movements of said controller for operating said latching means, means operated from inside the vehicle for shifting said controller from a first unlatching position to a first latching position, means responsive to movement of said closure for shifting said controller from said first unlatching position to a second unlatching position, and means operated from outside the vehicle for shifting said controller from said second unlatching position to a second latching position.

3. In a control mechanism for a vehicle having a plurality of closures, the combination comprising: a latching device to retain at least one of said closures in closed position, a controller adapted to operate said latching device, an actuator accessible inside said vehicle, means connected to said controller and adapted for operation by said inside actuator to shift said controller to one position for latching said closure and to a second position for releasing said closure, and an actuator accessible outside said vehicle for shifting said controller to a third position for latching said closure and for simultaneously moving said shifting means into a position to prevent operation thereof by said inside actuator.

4. In a control mechanism for a vehicle having a door, the combination comprising: a latching device to retain said door in closed position, a controller adapted to operate said latching device, an actuator accessible inside said vheicle, a link operatively connected to said actuator, said link with the controller in one position, being adapted to be operatively connected to said controller for shifting said controller to operate said latching device, and means associated with and responsive to opening and closing movements of said door and adapted, upon opening said door, to shift said controller to prevent operative connection of said link to said controller.

5. In a control mechanism for a vehicle having a door, the combination comprising: a latching device to retain said door in closed position, a controller adapted to operate said latching device, an actuator accessible inside said vehicle, a movable member operatively connected to said controller, said member in one position being adapted to be operatively connected to and operated by said inside actuator for shifting said controller to latch and release said door, and means associated with and responsive to opening and closing movements of said door and adapted upon opening of said closure to shift said movable member to a second position and thereby free said movable member from operation by said inside actuator.

6. A combination as defined in claim 5 for a vehicle having also a closure and a latch for retaining said closure, the combination having control means for said closure latch, said control means being adapted to be operated by a predetermined movement of the actuator, the movable member in its first mentioned position being adapted to preclude said predetermined movement of said actuator, said member when set in said second position by the door responsive means being adapted to free said actuator for said predetermined movement.

7. In a control mechanism for vehicles, the combination comprising a vehicle door latching device, a closure latching device, a first means for controlling one of said devices, a second means for controlling the other of said devices, actuating means for selectively operating said first and second control means, and means for shifting said first control means, said first control means in one position being operable by said actuating means and precluding operation of said second control means by said actuating means and in another position being inoperable by said actuating means and freeing said actuating means for operating said second control means.

8. In a control mechanism for a vehicle having a hood and a closure, the combination comprising: a latching device to retain said closure in closed position, a controller adapted to operate said latching device, means movable to a plurality of positions and operatively connected to said controller, an actuator, said movable means in one position being adapted to be operated by said actuator, means associated with and responsive to movements of said closure and adapted upon opening of said closure to shift said movable means to a second position and thereby free said controller from operation by said actuator, and latching means for the vehicle hood and adapted to be actuated by said actuator, said movable means in its said one position being adapted to preclude actuation of the hood latching means by said actuator and in said second position being adapted to free said actuator for operation to actuate said hood latching means.

9. In a control mechanism for a vehicle having a closure, the combination comprising: a controller, a latching device for said closure and adapted to be operated by said controller, an actuator accessible outside the vehicle and having operative connections for positively shifting said controller and said latching device to closure retaining and closure releasing positions, an actuator accessible inside the vehicle and having operative connections for shifting said controller and said latching device to closure retaining and closure releasing positions, said inside actuator being rendered inoperative to shift said controller when said closure has been latched by operation of said outside actuator, and a weight operatively connected with said inside actuator and operative, with said closure latched by said inside actuator, to return said inside actuator to closure releasing position, through inertia in the direction of travel of the vehicle, upon sudden deceleration of the vehicle or impact of collision.

10. In a control mechanism for a vehicle having a door, the combination comprising: a latching device to retain said closure in closed position, controlling means operatively connected to said latching device, an actuator inside the vehicle and having operative means to shift said controlling means to thereby shift said latching device, an actuator outside the vehicle and having operative means to shift said controlling means to thereby shift said latching means; said outside actuator in shifting said controlling means to place said latching device in door retaining position being adapted to render said inside actuator inoperative to shift said controlling means, and said inside actuator being weighted to automatically shift from door retaining position to thereby restore said controlling means and said latch device to door releasing position, through inertia in the direction of travel of the vehicle, upon sudden vehicle deceleration or the impact of collision.

11. In a latching mechanism for a vehicle having a closure, the combination comprising a latch member for the vehicle closure, a remote control means for said latch member, and a rod-like element operatively connected with said latch member and adapted to be rotated by said control means for moving said latch member into and out of latching position, said rod-like element being resilient and adapted to yield within its length and to twisting action in the event the said latch member is in the latching position when the closure is moved from open to closed position.

12. In a latching mechanism for a vehicle having a floor, a door and a door frame, the combination comprising: resilient rod-like means extending along the vehicle floor and substantially parallel to the door frame, a latch member carried by said rod-like means and engageable with the door in the closed position thereof to lock said door, and remote control means for said latch member and adapted to rotate said rod-like means for moving said latch member into and out of door latching position, whereby when the latch member is in said door latching position and the door is moved from open to closed position, the door rides over the latch member and forces the latch member to unlatching position, and the rod-like means yields under the torsional stresses set up by the latch member under the action of the door in closing and responds to the torsional stresses to restore the latch member to latching position, when the door reaches the closed position thereof.

13. In a control mechanism for a vehicle having a door and a closure, the combination comprising a latching device to retain the vehicle door in closed position, a controller adapted to operate said door latching device, an actuator accessible inside said vehicle, means adapted for operation by said inside actuator to shift said controller to a first position for latching the vehicle door and to a second position for releasing the vehicle door, means for shifting said controller to a third position, a latch device for the vehicle closure, and means for operating said closure latch device and adapted to be actuated by said inside actuator when said controller is in said third position, said closure latch device operating means being inoperable by said inside actuator when said controller is in said first and second positions.

14. In mechanism for controlling the latching of the doors of a motor vehicle to prevent unauthorized access thereto, the combination comprising; latches for the doors, a single control means mounted on the vehicle in an inaccessible position and operatively connected to the said door latches for positively moving them into and out of their door latching positions, the said control means normally occupying a position in which the door latches are released, an actuator mounted inside the vehicle operable to shift the said control means from its normal position in order to latch the doors and to restore the control means to its normal position, an actuator mounted on the outside of the vehicle inoperable to shift the control means from its normal position to a door latching position, and a third actuator operating in response to movement of one of the vehicle doors to shift said control means from its normal position to one in which it is operable by the outside actuator to effect latching of the doors, the actuation of said control means by one of said actuators determining the operability of each of the other actuators on said control means.

15. In control mechanism for a vehicle having a door, the combination comprising; a latching device adapted to latch or release the vehicle door, a controller operable to set and release said latching device and adapted to be shifted to at least four positions, a plurality of actuators for shifting said controller, one of said actuators responding to movement of the vehicle door to shift said controller from a first position of latch release to a second position of latch release and thereby set said controller for actuation by a second actuator accessible from the outside of the vehicle, said second actuator being adapted to shift said controller from said second latch release position to the fourth position thereof to retain the door when closed, a third actuator accessible from within the vehicle to shift said controller from said first position to a third position thereof in which the door is latched and to restore said controller to said first position, and key releasable means accessible from outside the vehicle for engaging said outside actuator to prevent its unauthorized operation to return said controller to said first position from either of said third and fourth positions.

16. In control mechanism for a motor vehicle to prevent unauthorized access to or operation of the vehicle, the combination comprising; a door latch, a locking dog for the steering wheel, a switch for supervising the electric circuits to the vehicle which circuits include one for supplying the motor ignition current, a single control means inaccessibly positioned with operative connections for operating the said latch, dog and switch, the said control means being shiftable to a plurality of positions by actuators, an actuator operable from within the vehicle, a second actuator operable from outside of the vehicle, the inside actuator being operable to shift the control means to positions for latching and releasing the door, and the outside actuator being normally operable only to shift the control means to a position in which the door is latched, the dog is in locking engagement with the steering wheel, and the switch is shifted to open the ignition circuit of the motor, and key operated means operable from outside the vehicle for releasing the outside actuator for operation to restore the control means to a position in which the door is released, the steering wheel is normally operable and the opened motor ignition circuit is closed to thereby condition the vehicle for authorized use, the actuation of said control means by said outside actuator to its door latching position being effective to render the said inside actuator inoperative to shift the said control means.

17. In control mechanism for a motor vehicle to prevent unauthorized access to or operation of the vehicle, the combination comprising; a latch for a closure of the vehicle, an inaccessible switch for controlling the ignition circuit of the motor, a controller with operative connections for positively operating the said latch and switch, an outside actuator normally operable only to shift the controller to latch the vehicle closure and to operate the said switch into a position in which the ignition circuit of the motor is opened, and key controlled means accessible from outside of the vehicle for releasing the outside actuator for operation of the controller to release the latch of the vehicle closure and restore the ignition circuit.

18. In control mechanism for a motor vehicle to prevent unauthorized access to or operation of the vehicle, the combination comprising; a latch for a closure of the vehicle, a locking dog for the vehicle steering mechanism, a controller with operative connections for positively operating the said latch and dog, an actuator manually operable from within the vehicle to shift the controller into positions in which the vehicle closure is either latched or unlatched, an outside actuator normally operable only to shift the controller to effect latching of the vehicle closure and engagement of the said dog with the steering mechanism to prevent turning of the steering wheel, and key controlled means accessible from outside the vehicle for releasing the outside actuator for operation of the controller to release the latch of the vehicle closure and to shift the dog out of its locking engagement with the said steering mechanism, the actuation of said controller by said outside actuator to its door latching position being effective to render the said inside actuator inoperative to shift the said controller.

19. In control mechanism for a motor vehicle to prevent unauthorized access to or operation of the vehicle, the combination comprising; a latch for a vehicle door, a switch device for supervisory control over the electric circuits of the vehicle including the motor ignition circuit, lighting circuits and a horn signal circuit, a closure to render said device inaccessible and a latch normally engaged to secure said closure, an inaccessibly positioned controller having operative connections with said first-named latch and said switch device for moving the latch into and out of door latching positions and for shifting the switch device to change the electrical connections in said circuits, an actuator accessible inside of the vehicle and operable to shift the controller into and out of door latching positions and also operable when the door is open to release and secure the said closure latch, an actuator operating in response to the opening of the vehicle door to shift the controller to an intermediate door latch release position and to restore the controller to an initial latch release position upon the closing of the door, an actuator accessible from outside of the vehicle normally operable only to shift the controller from the said intermediate door latch release position to a position of door latch engagement and the said switch device into a position in which the said electric circuits of the vehicle are changed to prevent normal operation for use of the vehicle, and key controlled means accessible from outside of the vehicle for releasing said outside actuator for operation of the controller to a position of door latch release and restoration of electric circuits to their normal condition, the actuation of said controller by one of said actuators determining the operability of each of the other actuators on said controller.

20. In control mechanism for a motor vehicle to prevent unauthorized access to and operation of the vehicle, the combination comprising; a latching device for the doors of the vehicle, an inaccessible switch device for exercising a supervisory control of the vehicle electric circuits, an inaccessibly positioned controller with operative connections for jointly operating said devices, an actuator accessible from inside of the vehicle with means for shifting the controller from an initial latch release position to an intermediate latch engaging position and back to the initial position, an actuator operative in response to the opening and closing of a vehicle door with means for shifting the controller from the initial latch release position to an intermediate latch release position and back to the initial position, and another actuator accessible from outside of the vehicle with means operable to shift the controller from the said intermediate latch release position to an ultimate latch engaging position and back to the said initial latch release position, the shifting movement of the controller to each of its positions from the initial position being effective to shift the said switch device to thereby change the vehicle circuit arrangements from a normal condition corresponding to the initial latch release position of the controller to other positions in which the circuits are useful only to an extent determined by the particular actuator last used to operate the latching device, the said circuits and latches being shifted to prevent normal operation or occupancy of the vehicle when the said controller is shifted to the said ultimate latch retaining position, the actuation of said controller by one of said actuators determining the operability of each of the other actuators on said controller.

21. In a control mechanism for a motor vehicle to prevent unauthorized access to and operation thereof, the combination comprising; latches for the doors, a locking dog for the vehicle steering mechanism, a controller mounted in an inaccessible position and having a predetermined angle of maximum movement, positive operative connections between the controller and the said latches and a lost motion connection with said dog, an actuator accessible from the interior of the vehicle for shifting said controller from one extreme position of latch release through an angle that is smaller than said maximum angle to actuate the door latches, an actuator accessible from outside of the vehicle for shifting said controller to the second extreme position to actuate the door latches, the movement of the controller to said second extreme position operating the said lost motion connection to move the said dog into locking engagement with the steering mechanism, the actuation of said controller by said outside actuator to its door latching position being effective to render said inside actuator inoperative to shift the said controller.

22. In control mechanism for a motor vehicle to prevent unauthorized access to the vehicle, the combination comprising; latches for the vehicle doors, a latch for securing a closure for a vehicle compartment, a controller inaccessibly positioned and having operative connections for securing and releasing the door latches; an actuator responsive to opening movement of a vehicle door for shifting the said controller from an initial position of latch release to a second position, and an actuator operable from within the vehicle to operate the controller to latch and release the doors, said last-named actuator being also operable to release the latch for the closure of said vehicle compartment when the controller has been shifted to said second position by opening movement of a door.

23. In control mechanism for a motor vehicle to prevent unauthorized access to and use of the vehicle, the combination comprising; a latching device for retaining the doors in closed position, a switch device inaccessibly positioned to exercise supervisory control over the electrical circuits of the vehicle, a controller inaccessibly positioned and connected for positive operation of said devices, means operable from within the vehicle for operating said controller to latch and release the doors, and means accessible from outside of said vehicle for operating said controller from a position of latch release to a latch retaining position, the actuation of said controller by each said means being also effective to operate said switch device to change the vehicle electrical circuits appropriately to authorized occupancy of the vehicle, the position occupied by the said switch device when the controller is shifted to the latch retaining position by the said means operable from outside the vehicle being effective to preclude the same use of the vehicle circuits that is possible when the vehicle is normally occupied and the controller movements are governed by the said means operable from within the vehicle, the actuation of said controller by one of said means determining the operability of each of the other of said means on said controller.

24. In control mechanism for a motor vehicle to prevent unauthorized access to or operation of the vehicle, the combination comprising; a latch for a door of the vehicle, an inaccessible switch for controlling the ignition circuit of the motor, an inaccessibly positioned controller with operative connections for positively operating the said latch and switch, an actuator operable from within the car to shift the controller to latch and to release the vehicle door, an outside actuator normally operable only to shift the controller to latch the vehicle door and to operate the said switch into a position in which the ignition circuit of the motor is opened, and key-controlled means accessible from outside the vehicle for releasing the outside actuator for operation of the controller to release the latch of the vehicle door and to restore the ignition circuit, the actuation of said controller by one of said actuators determining the operability of the other said actuator on said controller.

25. In control mechanism for a motor vehicle, the combination comprising; securing means inaccessibly located for locking the vehicle against unauthorized access thereto and means for precluding operation of those vehicle mechanisms that are necessary to the normal use and operation of the vehicle, an inaccessible shiftable controller having connections for positively operating both said means, an actuator operable from within the vehicle to shift and return the said controller to operate the said securing means to lock the vehicle against access from without, another actuator on the outside of the vehicle operable to shift the said controller to render the said securing means effective to lock the vehicle against entry and to render said second means effective to preclude operation of the said mechanisms that are necessary to the normal use and operation of the vehicle, and a key-controlled means accessible from outside the vehicle for releasing the said outside actuator to permit its operation to restore the controller to release the securing means and allow normal operation of said mechanisms, the shifting of said controller by one of said actuators determining the operability of the other actuator upon said controller.

WILLIAM W. DODGE, Jr.

CERTIFICATE OF CORRECTION.

Patent No. 2,366,391.    WILLIAM W. DODGE, JR.    January 2, 1945.

It is hereby certified that error appears in the printed specification of the above numbered patent requiring correction as follows: Page 1, first column, line 13, before "either" insert --from--; page 10, first column, line 10, claim 4, for "vheicle" read --vehicle--; line 32, claim 5, for "closure" read --door--; page 11, second column, line 7, claim 16, for "circuits to" read --circuits of--; and that the said Letters Patent should be read with this correction therein that the same may conform to the record of the case in the Patent Office.

Signed and sealed this 24th day of April, A. D. 1945.

Leslie Frazer (Seal)                              Acting Commissioner of Patents.